May 8, 1962  J. A. SKUPAS ETAL  3,032,805
CASTER CONSTRUCTION
Filed Nov. 20, 1959  2 Sheets-Sheet 1
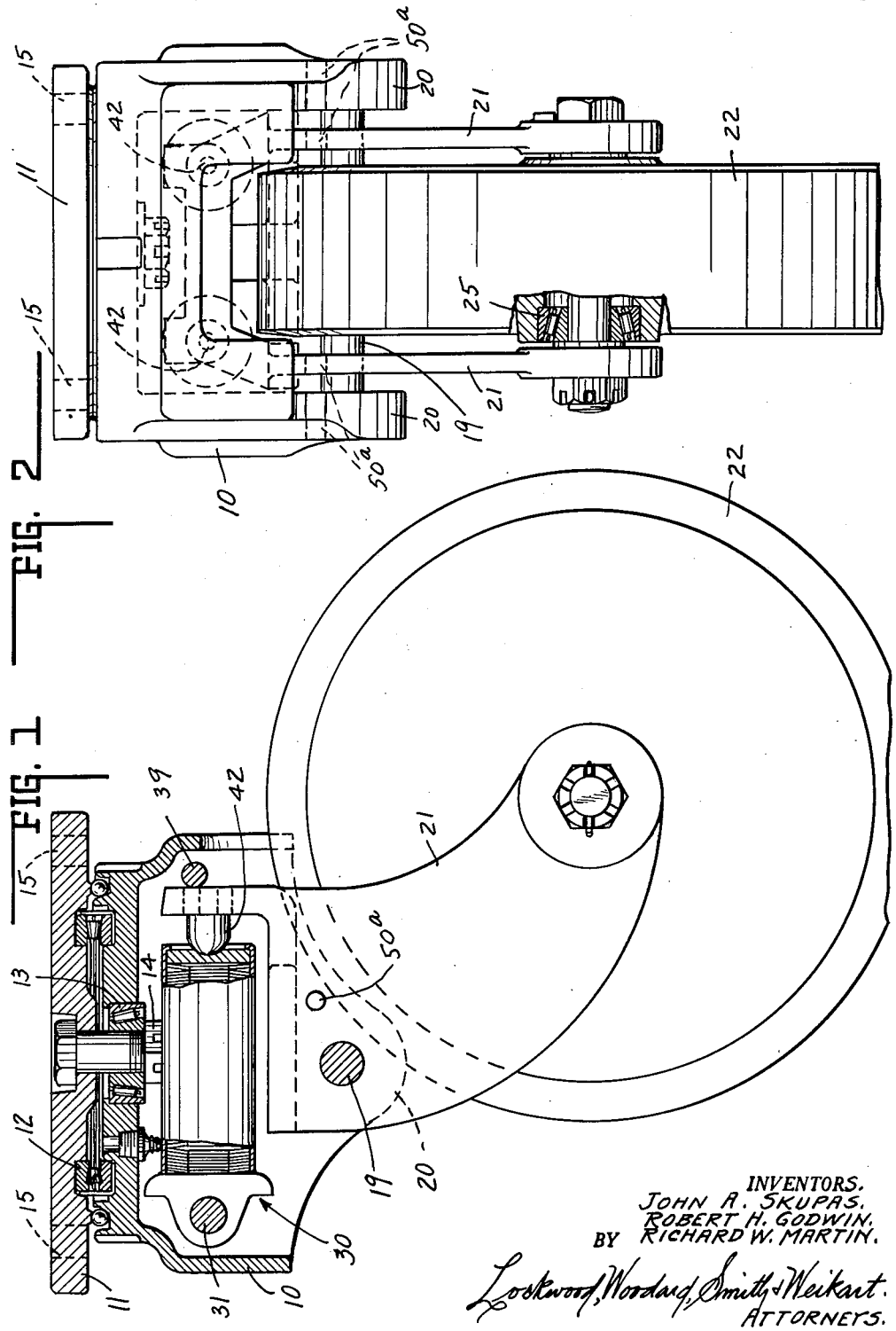
INVENTORS.
JOHN A. SKUPAS.
ROBERT H. GODWIN.
BY RICHARD W. MARTIN.
Lockwood, Woodard, Smith & Weikart.
ATTORNEYS.

May 8, 1962 J. A. SKUPAS ET AL 3,032,805
CASTER CONSTRUCTION
Filed Nov. 20, 1959 2 Sheets-Sheet 2
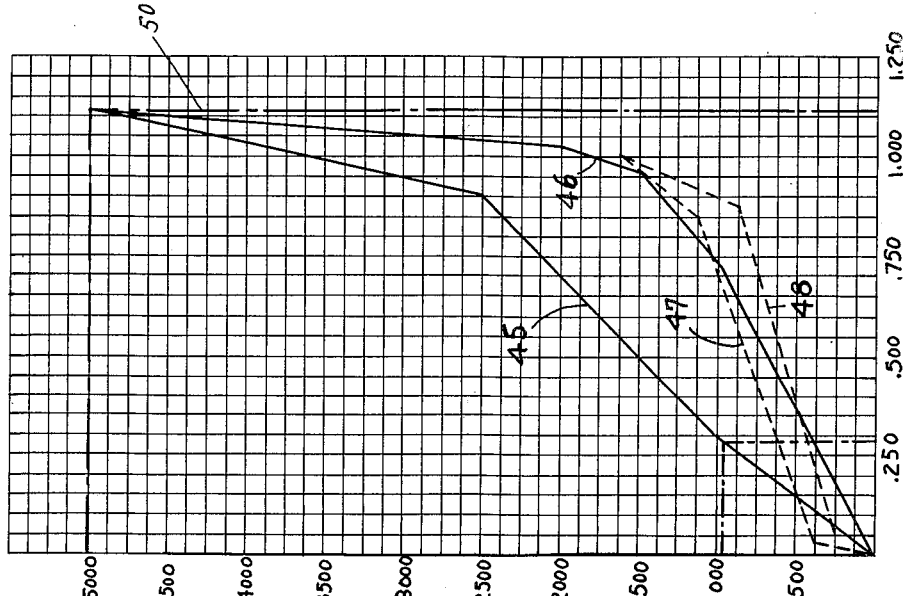
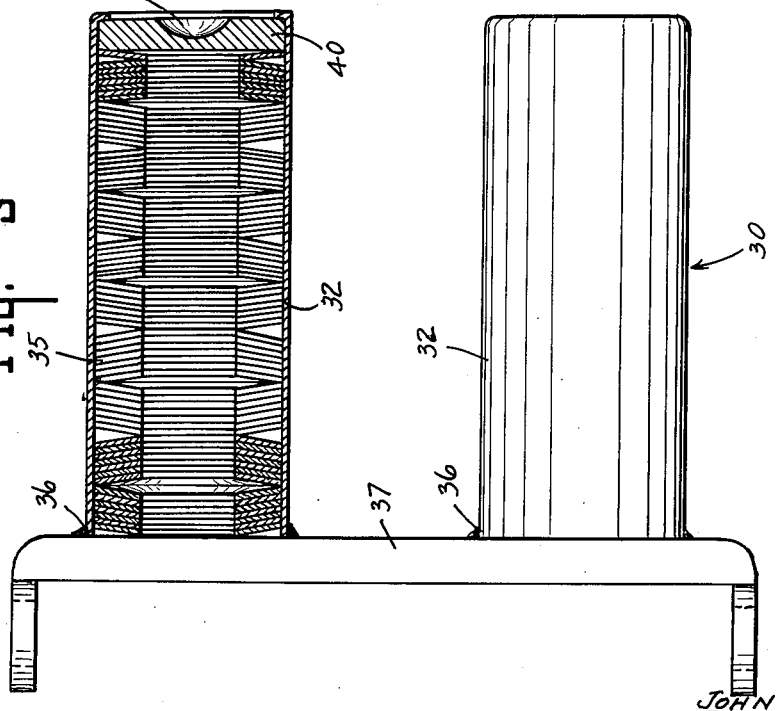
INVENTORS.
JOHN A. SKUPAS.
ROBERT H. GODWIN.
RICHARD W. MARTIN.
BY
Lockwood, Woodard, Smith & Weikart.
ATTORNEYS.

United States Patent Office

3,032,805
Patented May 8, 1962

1

**3,032,805
CASTER CONSTRUCTION**
John A. Skupas and Robert H. Godwin, Evansville, Ind., and Richard W. Martin, Henderson, Ky., assignors to Faultless Caster Corporation, Evansville, Ind., a corporation
Filed Nov. 20, 1959, Ser. No. 854,329
1 Claim. (Cl. 16—44)

The present invention relates to a caster construction and more particularly to a caster construction capable of absorbing shocks when a caster supported object is moved over rough terrain.

Most conventional casters incorporate no means for absorbing shocks transmitted to the casters when the object supported by the casters is moved over rough terrain. Frequently it is desirable to use casters for supporting objects which are fragile or which cannot be subjected to shocks. Some casters have been designed which incorporate springs; however, such casters have not proved to be completely satisfactory because they contain no means for satisfactorily damping the vibrations produced in moving over small obstructions such as door sills or the like.

It is, therefore, a primary object of the present invention to provide a caster construction which incorporates improved means for absorbing shocks produced in moving a caster supported object over rough terrain.

A further object of the invention is to provide a caster construction incorporating shock absorbing means which are covered or shielded for protection against dirt, ice and other undesirable elements.

Another object of the invention is to provide a caster construction which incorporates a shock absorbing spring arrangement and further incorporates means for preventing cocking or bending of the spring arrangement during operation thereof.

The invention further contemplates the provision of a caster construction including a shock absorbing means which is a high energy absorption, low deflection unit having a gradually increasing slope on the load deflection curve and having a large hysteresis loop area occurring during unloading.

A further feature of the invention is the provision of means which will absorb shock over a full range of deflection and additionally will dampen very rapidly after full deflection so as to reduce the possibility of resonance occurring when in operation on rough terrain.

Still further objects and advantages of the invention will become apparent as the description proceeds.

In accordance with the present invention there is provided a caster construction comprising a swivel head. Means are provided for swivel mounting the head upon an object. A caster horn is pivoted upon the swivel head and a wheel is rotatably mounted upon the horn in such a manner that the axis of the wheel is horizontally displaced with respect to the axis of pivotal mounting of the horn. One or more annular frusto-conically shaped resilient members are received between the horn and the swivel head for absorbing shocks delivered to the caster.

The full nature of the invention will be understood from the accompanying drawings and the following description and claim.

FIG. 1 is a front elevation of a caster construction embodying the present invention, certain portions of the structure being broken away in order to more clearly illustrate the internal components of the caster construction.

FIG. 2 is a side elevation of the caster construction of FIG. 1.

2

FIG. 3 is a plan view of a spring assembly forming a portion of the structure illustrated in FIGS. 1 and 2.

FIG. 4 is a graph of load plotted against deflection and illustrating the operation of the caster construction of the present invention.

Referring now to the drawings, this invention comprises a caster construction including a somewhat oblong swivel head 10 which is rotatably mounted upon a top plate 11 by means of suitable bearings 12 and 13 and by means of a bolt 14. The top plate 11 may be provided with suitable apertures 15 for mounting the top plate upon an object to be supported by the caster. The swivel head 10 has a downwardly opening cup-shape which covers and shields the components received within the head and also has a pair of downwardly projecting protuberances 20 which have fixed thereto so as to extend therebetween a rod 19 upon which is pivotally mounted a horn fork 21.

The horn fork or horn 21 has mounted between its downwardly projecting legs a conventional caster wheel 22. The wheel 22 is mounted for rotation between the legs of the horn by means of bearings 25, only one set of which is shown. It should be noted that the axis of rotation of the wheel 22 is spaced horizontally from the vertical axis about which the swivel head turns. Thus, the wheel 22 will always be aligned with the direction of movement of the supported object. It should also be noted that the axis of rotation of the wheel is spaced horizontally from the axis of the rod 19 upon which the horn is mounted.

A spring assembly, indicated generally by the numeral 30 is pivotally mounted at one end within the swivel head 10 for pivoting about a rod 31 which is fixed in any suitable manner to the head 10. It should be noted that the head covers and shields the spring assembly thus preventing dirt, ice and other unwanted elements from reaching the spring assembly and interfering with its operation.

The spring assembly comprises a pair of cylinders 32 (FIG. 3) having received therein a plurality of frusto-conically shaped annular spring members 35. The members 35 are arranged in nested groups, adjacent ones of the groups having their concave portions facing in opposite directions. The cylindrical members 32 have their ends 36 fixed to a transversely extending bracket 37 which provides the pivotal mounting for the spring assembly. Received within the end of each of the cylinders 32 is a force transmitting member 40 having a central recess 41 therein for reception of a projection 42 extending from the horn 21. A rod 39 is fixed to the head 10 and functions to prevent the horn from pivoting to a position wherein the projections 42 slip out of the recesses 41.

As the caster construction of the present invention moves over a rough terrain the horn 21 is caused to pivot about the rod 19 causing the springs 35 within the spring assembly to be flexed. Because of the particular construction of these springs the force produced by the bouncing of the caster over the rough terrain will be absorbed and will not reach the supported object. This is true because of the fact that the frusto-conically shaped springs have great tendency to absorb or dampen the vibrations produced by the flexing of the springs.

Referring to FIG. 4, there is depicted a performance graph of two caster assemblies, one constructed according to the present invention and the other incorporating a conventional spring. The values plotted on the vertical axis or ordinate indicate the normal force in pounds acting on the wheel. The values plotted on the horizontal axis or abscissa indicate the deflection in inches of the wheel.

The line 45 represents the loading curve of a caster constructed according to the present invention. The line 46 represents the unloading curve of the same caster. It can be seen that the great distance between these curves results in a relatively large hysteresis loop or shock absorbing effect.

On the same graph the line 47 represents the loading curve of a caster construction embodying a conventional spring, while the line 48 represents the unloading curve of that caster. It can be seen that there is much less of a hysteresis loop for a conventional spring and that, therefore, a conventional spring will not produce the same shock absorbing effect as the spring arrangement of the present invention. It should also be noted that as the spring arrangement of the present invention is deflected, its load curve rises exponentially and tends to approach an asymptote represented by the vertical line 50. This condition is reached when the frusto-conical members are in a perfectly flat position. The effect of this feature of the frusto-conical springs is that they have a much greater damping effect when the spring assembly reaches full deflection. Furthermore, more damping is provided at greater deflections and less damping at lesser deflections.

The spring assembly of the invention provides great flexibility of load ranges. For example, if it is desired to create a very soft spring rate, a large number of frusto-conical springs will be stacked in series. If it is desired to increase the spring rate to a very high value, a number of frusto-conical springs are arranged in parallel. To give a moderate spring rate, the frusto-conical springs are arranged in parallel series as illustrated with regard to the present embodiment.

It will be obvious from the above description that the present invention provides a caster construction incorporating improved means for absorbing shocks. It can also be seen that the cup-shaped head of the present invention provides a shielding and covering action for the spring assembly. Because of the fact that the spring assembly is pivotally mounted within the head, the spring assembly will not be cocked or bent but rather will give a true axial deflection during the operation of the caster. It has also been found that the invention eliminates shimmy at high traveling speeds over rough terrain.

If desired the horn 21 may be locked against pivoting with respect to the head 10 by inserting a suitable rod within generally aligned apertures 50a in the head and horn. Thus, the caster horn may be fixed with relation to the swivel head so that the caster operates as does a conventional non-spring caster.

While the invention has been disclosed and described in some detail in the drawings and foregoing description, they are to be considered as illustrative and not restrictive in character as other modifications may readily suggest themselves to persons skilled in this art and within the broad scope of the invention, reference being had to the appended claim.

The invention claimed is:

A caster construction comprising a head, means for swivel mounting said head upon an object, said head having its axis vertically disposed and having a downwardly opening cup shape, a horn fork pivotally mounted on said head and pivotal about a horizontal axis, the arms of said fork extending downwardly and away from said vertical axis, a wheel rotatably mounted between the extending portions of the arms of said fork, a spring carrier received within said head and pivotally mounted at one end upon said head, said spring carrier comprising a pair of side-by-side cylinders having their axes passing through the axis of pivotal mounting of said spring carrier, a plurality of groups of nested annular frusto-conically shaped springs received within said cylinders, adjacent ones of said groups having their concave portions facing in opposite directions, a pair of slidable members received within said cylinders upon said groups and having indentations facing out of said cylinders, said horn fork having a portion extending upwardly above the pivotal mounting of said fork and into said head, and a pair of protuberances extending from said portion and received in said indentations.

References Cited in the file of this patent

UNITED STATES PATENTS

| | | |
|---|---|---|
| 1,174,114 | Behrmann | Mar. 7, 1916 |
| 1,935,364 | Langen | Nov. 14, 1933 |
| 2,387,266 | Holland | Oct. 23, 1945 |
| 2,564,996 | Rasbach | Aug. 21, 1951 |
| 2,707,795 | Skupas | May 10, 1955 |
| 2,738,542 | Clark | Mar. 20, 1956 |
| 2,821,380 | Strandberg | Jan. 28, 1958 |

FOREIGN PATENTS

| | | |
|---|---|---|
| 523,115 | Great Britain | July 5, 1940 |
| 568,880 | Great Britain | Apr. 24, 1945 |